United States Patent
Harding et al.

(10) Patent No.: US 10,492,029 B2
(45) Date of Patent: *Nov. 26, 2019

(54) SHARING NAVIGATION DATA AMONG CO-LOCATED COMPUTING DEVICES

(71) Applicant: Google LLC, Mountain View, CA (US)

(72) Inventors: Dean Harding, Pymont (AU); Andrew Foster, Pymont (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,873

(22) Filed: May 14, 2018

(65) Prior Publication Data
US 2018/0332432 A1    Nov. 15, 2018

Related U.S. Application Data

(63) Continuation of application No. 15/003,035, filed on Jan. 21, 2016, now Pat. No. 9,973,887.

(51) Int. Cl.
*H04W 24/00* (2009.01)
*H04W 4/024* (2018.01)
(Continued)

(52) U.S. Cl.
CPC ........ *H04W 4/024* (2018.02); *G01C 21/3415* (2013.01); *G01C 21/362* (2013.01);
(Continued)

(58) Field of Classification Search
CPC . H04W 4/02; G01C 21/3415; G01C 21/3667; H04B 11/00
(Continued)

(56) References Cited

U.S. PATENT DOCUMENTS

| 5,864,771 A | 1/1999 | Yokoyama et al. |
| 7,508,300 B2 | 3/2009 | Mock et al. |

(Continued)

FOREIGN PATENT DOCUMENTS

| CN | 102111664 A | 6/2011 |
| CN | 103139313 A | 6/2013 |

(Continued)

OTHER PUBLICATIONS

Prosecution History from U.S. Appl. No. 15/003,035, dated Jan. 23, 2017 through Jan. 11, 2018, 91 pp.

(Continued)

*Primary Examiner* — Marceau Milord
(74) *Attorney, Agent, or Firm* — Shumaker & Sieffert, P.A.

(57) ABSTRACT

This document describes systems, methods, devices, and other techniques for sharing navigation data among computing devices. The techniques can include identifying, by a first computing device, a second computing device, based on the first computing device detecting an audio signal emitted by one or more speakers of the second computing device, wherein the second computing device is running a navigation application that has been programed to navigate a geographic route. Using information encoded in the audio signal that was emitted by the one or more speakers of the second computing device, the first computing device can determine the geographic route that the navigation application running on the second computing device has been programmed to navigate. A representation of the geographic route can be displayed on an electronic display of the first computing device.

18 Claims, 7 Drawing Sheets

(51) Int. Cl.
  *G01C 21/36* (2006.01)
  *H04B 11/00* (2006.01)
  *G01C 21/34* (2006.01)
  *H04W 4/02* (2018.01)

(52) U.S. Cl.
  CPC ..... *G01C 21/3667* (2013.01); *G01C 21/3697* (2013.01); *H04B 11/00* (2013.01); *H04W 4/02* (2013.01)

(58) Field of Classification Search
  USPC ........................................ 455/456.1
  See application file for complete search history.

(56) References Cited

U.S. PATENT DOCUMENTS

| | | | |
|---|---|---|---|
| 8,452,529 B2* | 5/2013 | Alten | G01C 21/3484 701/117 |
| 8,473,289 B2* | 6/2013 | Jitkoff | G01C 21/3608 704/231 |
| 8,620,770 B1 | 12/2013 | Pope | |
| 8,626,511 B2* | 1/2014 | LeBeau | G10L 15/30 379/45 |
| 8,700,310 B2 | 4/2014 | Jayanthi | |
| 8,775,275 B1 | 7/2014 | Pope | |
| 8,787,944 B2 | 7/2014 | Smith | |
| 9,146,130 B2 | 9/2015 | Takimoto et al. | |
| 9,195,290 B2* | 11/2015 | Siliski | G01C 21/265 |
| 9,232,354 B2 | 1/2016 | Smith | |
| 9,243,912 B2 | 1/2016 | Jayanthi | |
| 9,483,883 B2 | 11/2016 | Jayanthi | |
| 9,495,129 B2* | 11/2016 | Fleizach | G06F 3/167 |
| 9,626,963 B2* | 4/2017 | Farraro | G10L 15/22 |
| 9,762,851 B1* | 9/2017 | Baumert | G06K 9/00711 |
| 9,923,956 B2* | 3/2018 | Cahill | G06F 17/30312 |
| 9,973,887 B2* | 5/2018 | Harding | G01C 21/362 |
| 9,992,429 B2* | 6/2018 | Baumert | H04N 5/265 |
| 10,134,394 B2* | 11/2018 | Caseiro | G10L 15/197 |
| 10,201,524 B2* | 2/2019 | Sibley | C07D 403/14 |
| 2005/0186965 A1 | 8/2005 | Pagonis et al. | |
| 2006/0136544 A1 | 6/2006 | Atsmon et al. | |
| 2009/0265105 A1 | 10/2009 | Davis | |
| 2010/0088023 A1* | 4/2010 | Werner | A63B 24/0021 701/467 |
| 2012/0143503 A1 | 6/2012 | Hirai Kana et al. | |
| 2012/0190386 A1* | 7/2012 | Anderson | G01C 15/04 455/456.3 |
| 2012/0225645 A1 | 9/2012 | Sivan | |
| 2012/0253661 A1 | 10/2012 | Tuukkanen | |
| 2014/0018111 A1 | 1/2014 | Farley | |
| 2014/0050321 A1* | 2/2014 | Albert | H04W 12/04 380/270 |
| 2014/0146727 A1 | 5/2014 | Segev et al. | |
| 2014/0187149 A1 | 7/2014 | Lortz et al. | |
| 2014/0222341 A1 | 8/2014 | Rathi et al. | |
| 2014/0278094 A1 | 9/2014 | Stracke, Jr. | |
| 2015/0095327 A1 | 4/2015 | Sakuragawa et al. | |
| 2015/0127228 A1 | 5/2015 | Jeong et al. | |
| 2015/0134851 A1* | 5/2015 | Relan | H04L 45/126 709/241 |
| 2015/0179000 A1* | 6/2015 | Jayanthi | G01C 21/26 701/32.4 |
| 2016/0100290 A1 | 4/2016 | Smith | |
| 2016/0328244 A1* | 11/2016 | Ahmed | G06F 3/0482 |
| 2016/0378747 A1* | 12/2016 | Orr | G06F 3/167 704/9 |

FOREIGN PATENT DOCUMENTS

| | | |
|---|---|---|
| CN | 103269409 A | 8/2013 |
| CN | 103471602 A | 12/2013 |
| CN | 103512582 A | 1/2014 |
| CN | 103944647 A | 7/2014 |
| CN | 104041136 A | 9/2014 |
| CN | 104236578 A | 12/2014 |
| CN | 104344833 A | 2/2015 |
| CN | 104599478 A | 5/2015 |
| CN | 104792330 A | 7/2015 |
| CN | 104904241 A | 9/2015 |
| CN | 105593783 A | 5/2016 |
| DE | 102012016755 A1 | 6/2013 |
| DE | 112012005858 T5 | 1/2017 |
| JP | 2003531505 A | 10/2003 |
| JP | 2013254477 A | 12/2013 |
| JP | 201541372 A | 3/2015 |
| KR | 10-2015-0080561 A | 7/2015 |
| WO | 2014035434 A1 | 3/2014 |
| WO | 2014118912 A1 | 8/2014 |
| WO | 2015014306 A1 | 2/2015 |
| WO | 2015048307 A1 | 4/2015 |

OTHER PUBLICATIONS

Examination Report from counterpart Australian Application No. 2016388332, dated Nov. 27, 2018, 3 pp.
Office Action from counterpart German Application No. 10 2016 225 013.2 dated Oct. 18, 2018, 7 pp.
Response to Examination Report dated Nov. 27, 2018, from counterpart Australian Application No. 2016388332, filed Dec. 5, 2018, 27 pp.
Notice of Acceptance from counterpart Australian Application No. 2016388332, dated Dec. 11, 2018.
Examination Report from counterpart Canadian Application No. 3002856, dated Feb. 1, 2019.
Response to Communication under Rules 161(2) and 162 EPC dated Aug. 28, 2018 from counterpart European Application No. 16810555.9, filed Feb. 6, 2019.
Brian, "Google Maps for Android now lets you easily share directions," Engadget, Jan. 15, 2015 [retrieved on Jan. 21, 2016]. Retrieved from the Internet: URL<http://www.engadget.com/2015/01/15/google-maps-share-directions-android/>, 8 pages.
Holloway, "SonicNotify: The inaudible QR codes your smartphone can hear," Gizmag, Feb. 8, 2012 [retrieved on Jan. 21, 2016]. Retrieved from the Internet: URL <http://www.gizmag.com/sonicnotify-audio-signals/21385/>, 7 pages.
International Preliminary Report on Patentability issued in International Application PCT/US2016/063475, dated Aug. 2, 2018, 11 pages.
International Search Report and Written Opinion in International Application No. PCT/US2016/063475, dated Apr. 25, 2017, 18 pages.
Invitation to Pay Additional Fees and, Where Applicable, protest Fee, in International Application No. PCT/US2016/063475, dated Feb. 20, 2017, 7 pages.
Lazuka, "Proximity pairing of smartphones with ultra-high frequency sound waves," Circle with Me, Circle 38, 2013 [retrieved on Jan. 21, 2016]. Retrieved from the Internet: URL<http://circlewithme.tumblr.com/post/25893923940/proximity-paring-sound-waves>, 3 pages.
Metz, "Why Some Are Turning to Sound for Mobile Payments and More," Technology Review, Aug. 2013 [retrieved on Jan. 21, 2016]. Retrieved from the Internet: URL<http://www.technologyreview.com/news/518091/why-some-are-turning-to-sound-for-mobile-payments-and-more>, 3 pages.
Ozhiganov, "NFC Alternative: Transferring Data Between Mobile Devices Using Ultrasound," Azoft, Oct. 9, 2013 [retrieved on Jan. 21, 2016]. Retrieved from the Internet: URL<http://rnd.azoft.com/mobile-app-transering-data-using-ultrasound/>, 6 pages.
Rojo, "How to share directions on Google Maps," Uptodown, Dec. 12, 2013 [retrieved on Jan. 21, 2016]. Retrieved from the Internet: URL<http://blog.en.uptodown.com/how-to-share-directions-on-google-maps/>, 4 pages.
Unknown Author, "Navigation Made Easy: Passenger Destination Hits the App," Lyft, The Hub, Apr. 9, 2014 [retrieved on Jan. 21, 2016]. Retrieved from the Internet: URL<http://thehub.lyft.com/blog/2014/04/09/introducing-passenger-destination>, 5 pages.

(56) References Cited

OTHER PUBLICATIONS

Response to Examination Report from counterpart Canadian Application No. 3002856, dated Feb. 1, 2019, filed May 3, 2019, 21 pp.
Examination Report from counterpart European Application No. 16810555.9, dated May 23, 2019, 9 pp.
Notice of Office Action, and translation thereof, from counterpart Korean Application No. 10-2018-7011275, dated Mar. 21, 2019, 22 pp.
Response to Examination Report dated May 23, 2019, from counterpart European Application No. 16810555.9, filed Sep. 11, 2019, 17 pp.
First Office Action, and translation thereof, from counterpart Japanese Application No. 2018-520569, dated Aug. 27, 2019, 13 pp.
Notice of Allowance of Patent from counterpart Korean Application No. 10-2018-7011275, dated Aug. 14, 2019, 3 pp.
First Office Action, and translation thereof, from counterpart Chinese Application No. 201611234923.9, dated Sep. 20, 2019, 40 pp.

\* cited by examiner

SHARING NAVIGATION DATA AMONG CO-LOCATED COMPUTING DEVICES

CROSS-REFERENCE TO RELATED APPLICATIONS

This application is a continuation of and claims priority to U.S. application Ser. No. 15/003,035, filed on Jan. 21, 2016, the entire contents of which are hereby incorporated by reference.

TECHNICAL FIELD

This document generally relates to computer-based navigation techniques, and more particularly to sharing navigation data among computing devices.

BACKGROUND

Motorists are increasingly turning to the use of computer-based navigation applications to plan trips, determine geographic routes, and to provide turn-by-turn navigation directions along a route. Some sophisticated navigation applications today are capable of using location information to display geographic maps of an area in the region of a navigation device, and to present additional information to motorists such as traffic status, distance remaining to a destination, estimated arrival time, public transportation information, zoomable street views, live traffic information, terrain, transit lines, points of interest, and more. A driver of a motor vehicle can interact with some navigation applications through a user interface on a touchscreen of a portable computing device.

SUMMARY

This document generally describes systems, methods, devices, and other techniques for sharing navigation data among co-located devices. In some examples, a driver may program his or her personal computing device, or a fixed navigation system in a vehicle, to navigate a geographic route. Although the navigation system may operate mostly autonomously once a route has been set, driving is often a dynamic experience that requires motorists to adapt to different conditions (e.g., traffic conditions, road construction, weather changes, or changed plans or destinations). In such circumstances, the driver may, for example, benefit from a passenger's assistance in helping to navigate the route or to make changes to the route. The passenger's assistance may reduce the occasions for which the driver needs to interact with his or her navigation device during a trip, for example, which can be distracting from the primary task of driving.

Accordingly, this document describes techniques by which the driver's device may communicate navigation data to a personal computing device that belongs to the passenger. Upon receiving the navigation data, the passenger's device may use the data to replicate the driver's geographic route so that the passenger can inspect the route and further help the driver to navigate. In some implementations, the driver may delegate control of certain functions on the driver's device to the passenger during a trip, which may allow the passenger to use his or her own device (the passenger's device) to modify the route on the driver's device, and to perform other tasks for the driver without requiring the driver's input to attend to the task. In some implementations, the data can be communicated between the driver's device and the passenger's device using high-frequency audio signals encoded with navigation data or pointers to navigation data stored at a server system.

Some implementations of the subject matter described herein include computer-implemented methods for sharing navigation data among co-located computing devices. The methods can include identifying, by a first computing device, a second computing device, based on the first computing device detecting an audio signal emitted by one or more speakers of the second computing device, wherein the second computing device is running a navigation application that has been programed to navigate a geographic route. Using information encoded in the audio signal that was emitted by the one or more speakers of the second computing device, the first computing device can determine the geographic route that the navigation application running on the second computing device has been programmed to navigate. A representation of the geographic route can be displayed on an electronic display of the first computing device.

These and other implementations can optionally include one or more of the following features.

Identifying the second computing device can include (i) causing one or more speakers of the first computing device to emit a first audio signal that indicates the presence of the first computing device, and (ii) monitoring for a response to the first audio signal for a period of time. The audio signal emitted by the one or more speakers of the second computing device can be a second audio signal. The second computing device can cause the second audio signal to be emitted in response to detecting the first audio signal.

The first computing device is a mobile computing device. The second computing device can be a mobile computing device or can be at least a portion of an integrated navigation computer system installed in a vehicle.

A center frequency of the audio signal can be at least 20 kilohertz.

Using information encoded in a second audio signal emitted by the one or more speakers of the second computing device, the navigation application running on the second computing device can be identified as having been re-programmed to navigate a modified geographic route that is different than the geographic route. The first computing device can detect the second audio signal while continuing to display the representation of the geographic route on the electronic display of the first computing device. The first computing device can determine, using information encoded in the second audio signal, the modified geographic route that the navigation application running on the second computing device has been re-programmed to navigate. In response to determining the modified geographic route, the first computing device can automatically change from displaying the representation of the geographic route on the electronic display of the first computing device to displaying a representation of the modified geographic route on the electronic display of the first computing device.

The audio signal can encode an address that indicates a location on a computer network at which information that specifies the geographic route can be accessed. Determining the geographic route that the navigation application running on the second computing device has been programmed to navigate can include using the address encoded in the audio signal to access the information that specifies the geographic route.

The location on the computer network at which the information that specifies the geographic route can be accessed can be a location not on the first computing device or the second computing device.

Content that identifies the second computing device or a user of the second computing device can be displayed, along with the representation of the geographic route and on the electronic display of the first computing device, so as to indicate that the representation of the geographic route being displayed has been shared with the first computing device by the second computing device or by the user of the second computing device.

The first computing device can be located in a vehicle. The second computing device can be located in the vehicle. The first computing device can belong to a passenger of the vehicle. The second computing device can belong to a driver of the vehicle.

User input can be received, at the first computing device, to modify the geographic route to generate a modified geographic route. Information that is formatted to cause the navigation application running on the second computing device to change from navigating the geographic route to navigating the modified geographic route can be transmitted to the second computing device in response to receiving the user input to modify the geographic route.

In response to determining the geographic route that the navigation application running on the second computing device has been programmed to navigate, a navigation application running on the first computing device can be automatically enabled to navigate the determined geographic route. While the navigation application running on the first computing device is navigating the determined geographic route, a search query can be received at the first computing device. One or more search results can be obtained, based on the search query and information about the geographic route, that indicate respective locations determined to be relevant to the search query and determined to be located within a pre-defined vicinity of the geographic route.

Data can be received that indicates user input has selected a particular search result among the one or more search results. In response to receiving the data that indicates that the user input has selected the particular search result, information can be transmitted to the second computing device that is formatted to cause the navigation application running on the second computing device to navigate to the location identified by the particular search result.

Some implementations of the subject matter described herein can include one or more non-transitory computer-readable media having instructions stored thereon that, when executed by one or more processors, cause performance of operations. The operations can include identifying, by a first computing device, a second computing device, based on the first computing device detecting an audio signal emitted by one or more speakers of the second computing device, wherein the second computing device is running a navigation application that has been programed to navigate a geographic route; determining, by the first computing device and using information encoded in the audio signal that was emitted by the one or more speakers of the second computing device, the geographic route that the navigation application running on the second computing device has been programmed to navigate; and displaying a representation of the geographic route on an electronic display of the first computing device.

Some implementations of the subject matter described herein can include a computer-implemented method. The method can include receiving, at a first computing device that is running a navigation application that has been programmed to navigate a geographic route, a request from a second computing device for the first computing device to share the geographic route with the second computing device; in response to receiving the request, generating an audio signal that is encoded with information that is usable by the second computing device to determine the geographic route being navigated by the navigation application of the first computing device; and causing the audio signal to be emitted by one or more speakers of the first computing device or one or more speakers of a vehicle for detection by the second computing device.

These and other implementations can optionally include one or more of the following features. In response to receiving the request from the second computing device for the first computing device to share the geographic route with the second computing device: (i) an identity of the second computing device or an identity of a user of the second computing device can be determined, and (ii) based on the identity of the second computing device or the identity of the user of the second computing device, a determination can be made as to whether the second computing device or the user of the second computing device is authorized to receive navigation data shared by the first computing device.

The first computing device can generate the audio signal and cause the audio signal to be emitted in response to determining that the second computing device or the user of the second computing device is authorized to receive navigation data shared by the first computing device. The first computing device can be configured, in response to a determination that the second computing device or the user of the second computing device is not authorized to receive navigation data shared by the first computing device, to not share with the second computing device the information that is usable by the second computing device to determine the geographic route being navigated by the navigation application of the first computing device.

Determining whether the second computing device or the user of the second computing device is authorized to receive navigation data shared by the first computing device can include determining whether a social media account of a user of the first computing device is connected to a social media account of the user of the second computing device.

Determining whether the second computing device or the user of the second computing device is authorized to receive navigation data shared by the first computing device can include determining whether the user of the second computing device is listed in a contact list for a user of the first computing device.

The first computing device can receive, at a time after causing the audio signal to be emitted for detection by the second computing device and while the navigation application running on the first computing device continues to navigate the geographic route, a second audio signal emitted by the second computing device that is encoded with information usable to determine a different, second geographic route. In response to receiving the second audio signal, the first computing device can automatically determine the second geographic route and re-program the navigation application running on the first computing device to navigate the different, second geographic route.

Some implementations of the subject matter described herein can include one or more non-transitory computer-readable media having instructions stored thereon that, when executed by one or more processors, cause performance of operations comprising: receiving, at a first computing device that is running a navigation application that has been programmed to navigate a geographic route, a request from a second computing device for the first computing device to share the geographic route with the second computing device; in response to receiving the request, generating an audio signal that is encoded with information that is usable by the second computing device to determine the geographic route being navigated by the navigation application of the first computing device; and causing the audio signal to be emitted by one or more speakers of the first computing device or one or more speakers of a vehicle for detection by the second computing device.

Some implementations of the subject matter described herein can include receiving, by a first computing device and as having been sent from a second computing device located within a proximity of the first computing device, first navigation data that specifies a geographic route that a navigation application at the second computing device is programmed to navigate; executing the first navigation data by the first computing device to generate a representation of the geographic route at the first computing device; receiving, by the first computing device, user input to modify the geographic route to generate a modified geographic route; and transmitting, by the first computing device and to the second computing device, information usable to access second navigation data that specifies the modified geographic route.

These and other implementations can optionally include one or more of the following features. A copy of the second navigation data can be transmitted to a computing system separate from the first computing device and the second computing device. Transmitting the information that is usable to access the second navigation data that specifies the modified geographic route can include transmitting to the second computing device a pointer that indicates a location of the second navigation data at the computing system.

Receiving the first navigation data that specifies the geographic route can include receiving an audio signal that is encoded with the first navigation data or that is encoded with a pointer that indicates a network location at which the first navigation data is stored.

Particular implementations of the subject matter described herein can, in certain instances, realize one or more of the following advantages. Navigation data can be shared from a driver's device to a passenger's device so as to allow a passenger to track the progress of a trip and to collaborate with the driver to discuss alternative route options. In some implementations, the passenger may use his or her own computing device to replicate a route being navigated on a driver's computing device, to make changes to the route, and to transmit navigation data to the driver's computing device that causes the driver's computing device to automatically update the route according to the passenger's instruction. As such, the driver may be able to focus on driving the vehicle rather than interacting with his or her navigation device to make route changes, search for points of interest, inspect traffic conditions, and more. In some implementations, the passenger's device and driver's device may communicate messages using short-range audio signals. The range of the audio signals may be configured so that communications are restricted to devices within the same vehicle, and devices outside of the vehicle are generally prevented from detecting signals from devices within the vehicle. The audio signals can therefore at least partially assure that navigation data is transmitted between co-located computing devices. In some implementations, these techniques can advantageously allow navigation data to be shared among co-located devices by using the fact that the devices are in close proximity alone to authenticate the sharing. For example, there may be no need for the driver or passenger to submit credentials, sign into an account, or otherwise demonstrate a prior association between the devices in order to authenticate the sharing of navigation data.

BRIEF DESCRIPTION OF THE DRAWINGS

Like reference symbols in the various drawings indicate like elements.

DETAILED DESCRIPTION

Figure 1:
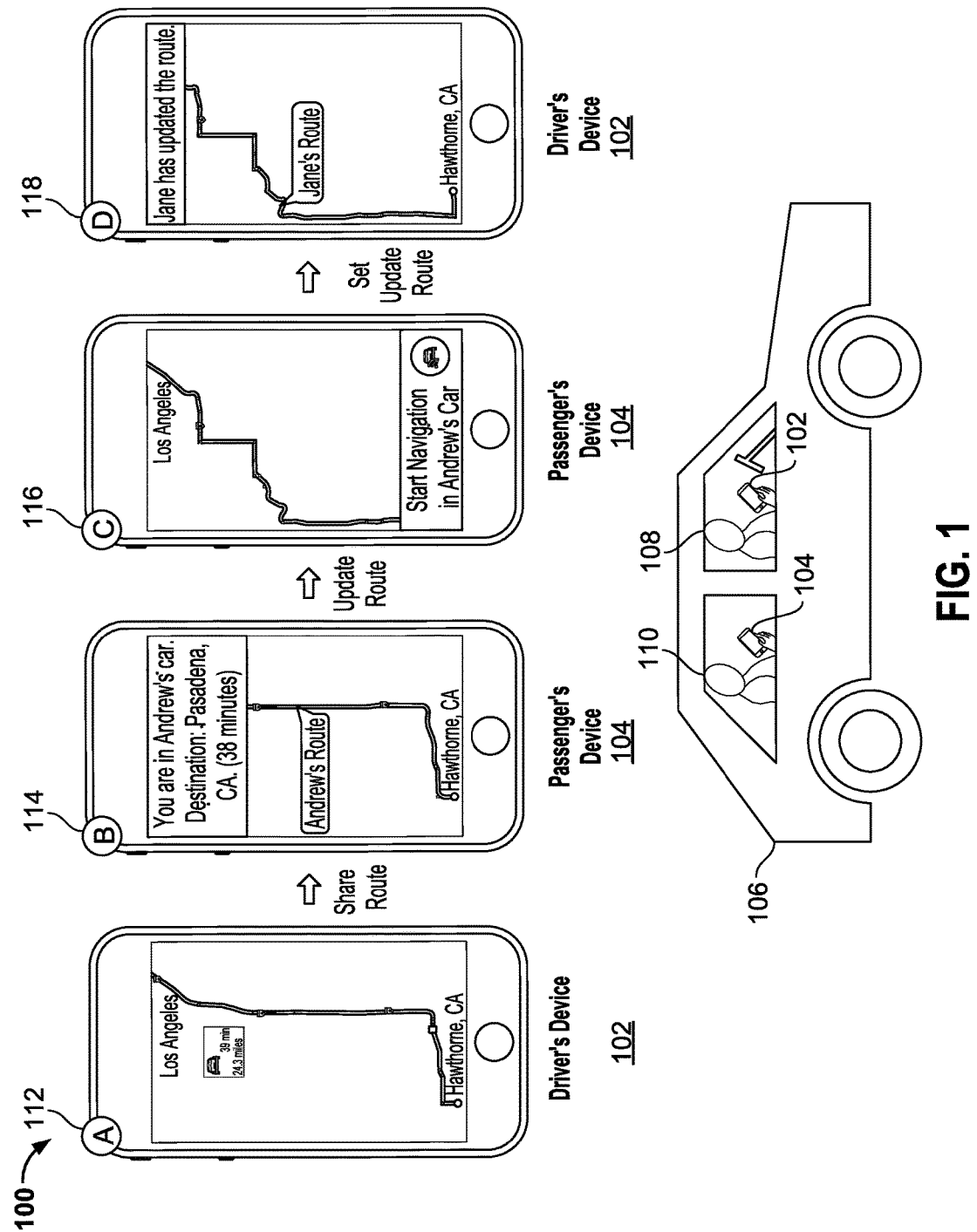
FIG. 1 is a conceptual flow diagram that illustrates navigation data being shared between a driver's computing device and a passenger's computing device in a vehicle.

This document generally describes systems, methods, devices, and other techniques for sharing navigation data among co-located devices, such as devices that are each located in the same vehicle. In some implementations of the techniques described herein, a driver of an automotive vehicle may provide one or more passengers in the vehicle the ability to replicate on the passengers' personal devices a geographic route that has been programmed into a navigation application on a personal device of the driver (e.g., a smartphone or tablet computing device) or on a vehicle navigation computing system. The passengers may then enjoy the ability to monitor the progress of a trip as the route is traveled. In some cases, a passenger may also use navigation data shared by the driver to further assist the driver in navigating a route or in making modifications to a route. For example, midway through a trip in which the driver is following an initially programmed route, the driver may decide that he or she needs to diverge from the route to make an unplanned stop at a grocery store. The driver's attention may be focused on driving the vehicle, thereby making it potentially distracting or difficult for the driver to interact with his or her smartphone or other navigation device to locate a grocery store between the vehicle's current location and the ultimate destination of the route, and also potentially distracting or difficult for the driver to modify the route to include a stop at the grocery store. Therefore, the techniques described herein may allow a passenger who has replicated the initially planned route on his or her personal computing device, for example, to search for a suitable grocery store, to update the route so as to include a stop at the grocery store, and to transmit instructions to the driver's navigation device that causes the driver's device to automatically update the route in the manner specified by the passenger to include the stop at the grocery store. The passenger can thus aid the driver in managing navigation functions during a trip, so as to reduce the occasions during which the driver must interact with his or her navigation device while driving.

In some implementations, the techniques described herein can provide reliable communications for sharing navigation data among co-located computing devices. For example, navigation data may be shared in a manner that mitigates the likelihood that unauthorized passengers can obtain a driver's navigation data, and in a manner that requires relatively little user effort to initiate the sharing of navigation data. In some implementations, messages that contain navigation data or pointers to navigation data may be transmitted between co-located computing devices using short range signals (e.g., high frequency audio signals) that are generally detectable by devices within proximity of each other (e.g., within the same vehicle cabin), but that are not generally detectable by devices beyond the short range of the signal (e.g., outside of the vehicle or beyond a threshold distance from the vehicle). Moreover, navigation data may be shared between co-located devices, in some implementations, even when there has been no prior association between the devices. For example, a passenger device may receive broadcasted navigation data from another device in a vehicle by virtue of being in close proximity to the broadcasting device, even if the passenger device is not otherwise authenticated by the broadcasting device. Therefore, relatively little user effort may be expended by either the driver or passenger to initiate a sharing of navigation data.

Turning to FIG. 1, a conceptual flow diagram is shown of navigation data being shared between a driver's device 102 and a passenger's device 104 in a vehicle 106. The vehicle 106 is being driven by a first occupant, driver 108, and is being ridden in by a second occupant, passenger 110. The driver 108 and the passenger 110 each has a computing device capable of running a navigation application that can provide turn-by-turn directions along a geographic route to a destination. The driver's device 102 and the passenger's device 104 may each be, for example, a dedicated portable navigation device, a smartphone, a tablet computing device, a smartwatch or other wearable device, an integrated vehicle navigation device, or a notebook computer.

FIG. 1 generally depicts four stages A-D (112-118) of operations performed between the driver's device 102 and the passenger's device 104. The operations at these stages are briefly described here, but are described in further detail with respect to FIGS. 2A-2C, 3, and 4. Stage A (112) generally represents the beginning of a road trip in the vehicle 106, where the driver 108 has programmed the driver's device 102 to navigate along a first geographic route. For example, the route shown at stage A (112) runs from Hawthorne, Calif. to Pasadena, Calif. A substantial portion of the route runs along Interstate Highway 110 (I-110). After the route has been programmed into the driver's device 102, at stage B (114), navigation data that defines that first geographic route is shared with the passenger's device 104. In some implementations, navigation data that defines the route can be transmitted directly from the driver's device 102 to the passenger's device 104 via short-range audio or radio signals. In some implementations, a pointer that identifies a network location (such as a location on a remote, cloud-based server) at which the navigation data can be accessed, can be transmitted from the driver's device 102 to the passenger's device 104, and the passenger's device can then retrieve the actual navigation data that contains the information needed to replicate the first geographic route from the remote server. Upon obtaining the driver's shared navigation data, the passenger's device 104 can begin navigation along the first geographic route. For example, a representation of the route can be presented on a map, as shown by the passenger's device 104 at stage B (114). The passenger 110 can also be presented with text and/or graphical elements that indicate the route being displayed was shared from another device. For example, at stage B (114), the passenger's device 104 displays an annotation along the route that identifies the route by the driver's name (e.g., "Andrew's Route"). A notification is also displayed above the map, which states to the passenger 110 that "You are in Andrew's car," and that provides basic information about the route such as its destination and the estimated time of arrival.

In some implementations, the passenger 110 can make changes to the first geographic route. The passenger 110 may modify the route, for example, to direct the route through one or more points of interest, to avoid traffic, or simply for a change of scenery. As shown on the display of the passenger's device 104 at stage C (116), the passenger 110 has re-directed the route to avoid I-110. The modified route may be selected among one or more suggested routes determined by the navigation application, or it may be manually set by the passenger 110, or by a combination of algorithmic and manual techniques. Once the modified route has been set, the passenger 110 may select a control in a user interface of the navigation application to communicate the modified route to the driver's device. In some implementations, navigation data that defines the modified route may be communicated from the passenger's device 104 to the driver's device 102 in a like manner to how the first route was communicated from the driver's device 102 to the passenger's device 104. For example, messages encoded in a short-range audio or radio signal may be transmitted from the passenger's device 104 and received by the driver's device 104. The messages may contain the navigation data for the modified route itself, or a pointer to the navigation data located on a remote server, so as to allow the driver's device 102 to access the data through a wireless network connection (e.g., an LTE, CDMA, GSM, 3G, or other wideband wireless area network connection). At stage D (118), the driver's device 102 may automatically update the route based on the new parameters set by the passenger 110 on the passenger's device 104. Accordingly, the driver can continue to use his or her device 102 for navigation without the distraction of re-configuring a route while driving.

Figure 2A:
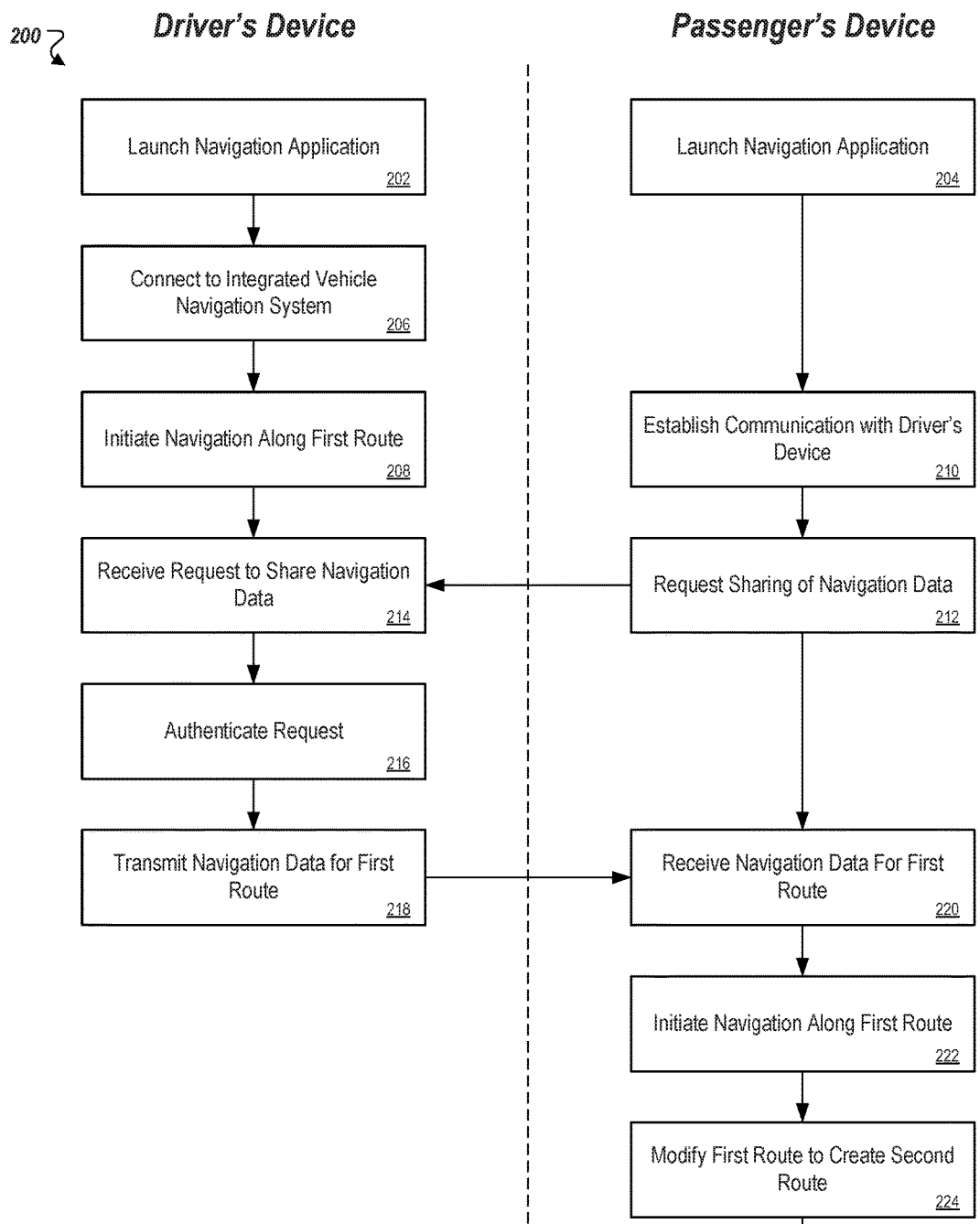
FIGS. 2A-2C depict a swim-lane diagram of an example process for sharing navigation data among computing devices co-located in a vehicle.
Figure 2B:
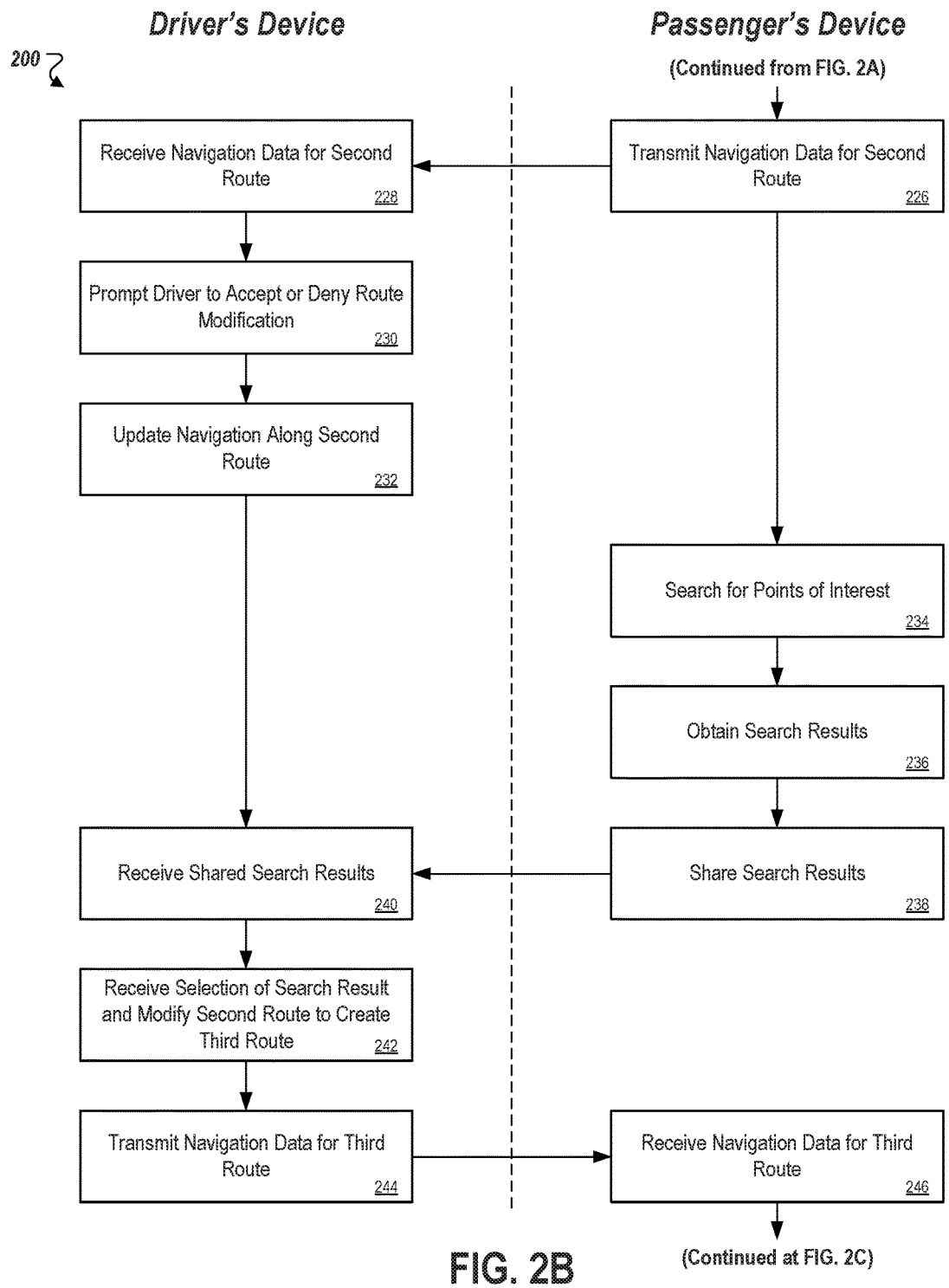
Figure 2C:
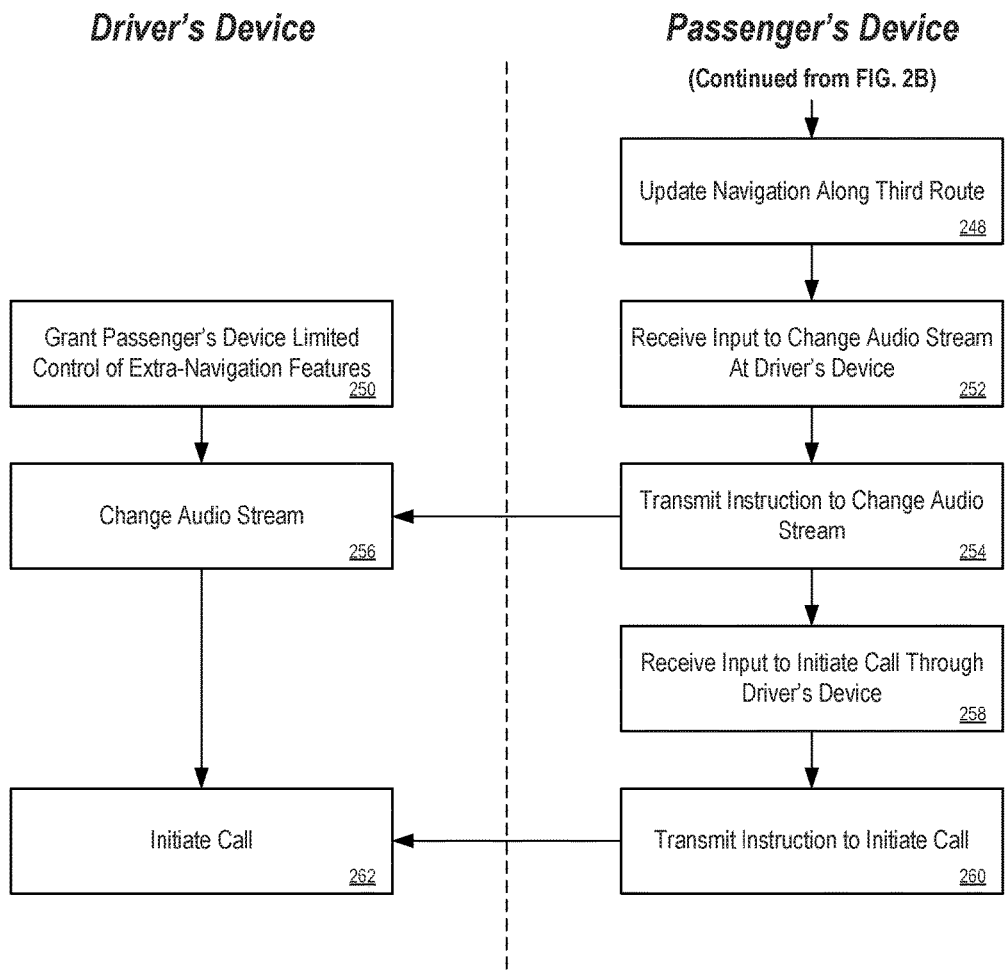

Referring to FIGS. 2A-2C, a swim-lane diagram is shown of an example process 200 for sharing navigation data among computing devices co-located in a vehicle. Although the swim-lane diagram depicts example operations that occur between just two devices (namely, a driver's device and a passenger's device), in some implementations, similar techniques may be implemented with additional devices and alternative arrangements of devices. For example, the driver's device, the passenger's device, or both may be connected through an in-vehicle navigation system that is part of the vehicle's integrated computing system (e.g., a navigation system with a display built into the dashboard of the vehicle). In some implementations, the driver's device may be a personal mobile device of the driver of the vehicle, such as a smartphone, a tablet computing device, a notebook computer, a dedicated portable navigation device, or a smartwatch or other wearable device. The passenger's device likewise may be any of these types of devices. In some implementations, the driver's device may be the in-vehicle navigation system that is part of the vehicle's integrated computing system. In some implementations, multiple passenger devices may connect to the driver's device and/or the in-vehicle navigation system. These various arrangements are discussed further below with respect to FIG. 3, for example.

In some implementations, the process 200 begins at stages 202 and 204, where the driver's device and the passenger's device launch respective navigation applications at each of the devices. The navigation application may be a native application (e.g., on a dedicated, portable navigation device) or may be an installed third-party application (e.g., GOOGLE MAPS for mobile) depending on the type of device running the application. The navigation applications are generally capable of determining routes to one or more destinations specified by users of the respective devices, displaying representations of the routes overlaid on an electronic map, and accessing a current location of the computing device for use in determining a starting point for a route, for example. The navigation applications can, but need not be, launched at the same time at the driver's device and the passenger's device. In some implementations, for example, the driver of a vehicle may first launch the navigation application and set a route to guide his or her driving to a given destination. After navigating the route for some time, the driver may ask a passenger in the vehicle for assistance in making changes to the initially planned route. At that time, the passenger may turn his or her device on, and launch the navigation application on the passenger device. According to the techniques described herein, the passenger may act as the driver's navigator, such as by modifying the route to avoid traffic, adding points of interest to visit along the route, performing searches for relevant locations near the route, and more. Notably, many of these actions may be taken by the passenger without a need for the driver to be distracted with significant interactions with the driver's device.

At stage 206, the driver's device optionally connects to the vehicle's integrated navigation system. The integrated vehicle navigation system may be configured to perform similar functions as the navigation applications on the driver's device and passenger's device, such as determining routes to user-specified destinations, playing turn-by-turn directions for navigating a route, and displaying all or a portion of the route on an electronic display of the vehicle (e.g., on an LCD display provided in a dashboard of the vehicle). The driver's device may connect to the integrated vehicle system via a wired connection (e.g., USB cable) or by a short-range wireless connection (e.g., BLUETOOTH). In some implementations, the vehicle navigation system may pull relevant parameters for a given trip from the driver's device, and may then re-construct and execute the trip substantially independent of the driver's device. For example, the vehicle navigation system may obtain from the driver's device a programmed destination for a trip and information that defines a route to the destination, and may then begin navigating the route according to the parameters from the driver's device. In some implementations, the vehicle navigation system may be a relatively thin client that relies more substantially on the driver's device to perform navigation functions. For example, the navigation system may simply mirror the audiovisual content from the navigation application on the device to the display and stereo system in the vehicle. In implementations where the driver's device does connect to the integrated vehicle navigation system, the passenger's device may communicate with vehicle system either directly or indirectly through the driver's personal device. The remaining discussion of FIGS. 2A-2C refers to communications between the passenger's device and the driver's device (and to operations performed by the driver's device). However, if the driver's device were connected to a separate vehicle navigation system, it should be appreciated that at least some of these communications and operations may involve the vehicle navigation system rather than or in addition to the driver's personal navigation device.

At stage 208, the driver's device initiates navigation along a first route. The first route may be determined based on one or more parameters specified by a user (e.g., the driver) and based on the current location of the driver's device. For example, the driver's device may have a GPS receiver that identifies the current location of the device as being in Eden Prairie, Minn. The driver may type or dictate to the device that he or she wishes to navigate to TARGET Field in Minneapolis, Minn. The driver's device may then determine one or more routes for navigating from Eden Prairie to TARGET Field in Minneapolis. The driver may select a preferred route and initiate navigation. While navigating the selected route, the driver's device may provide turn-by-turn directions to the driver that indicate driving maneuvers the driver should make to reach the selected destination.

Meanwhile, as the driver's device is navigating the first route, the passenger's device may establish communication with the driver's device at stage 210, and further may register with the driver's device as a passenger's device located in the same vehicle as the driver's device. In some implementations, the passenger's device may establish communication with the driver's device at other times as well, such as before the driver's device has initiated navigation of the first route. Various technologies may be used to provide a communications connection between the driver's device and the passenger's device. In some implementations, for example, the driver's device and passenger's device may communicate through a short-range wireless connection, such as a BLUETOOTH connection. In some implementations, even shorter range wireless technologies such as near-field communications (NFC) protocols or Radio-Frequency Identification (RFID) may be employed to communicate navigation data between the driver's device and the passenger's device. In some implementations, the devices may communicate through a wireless network, such as a WI-FI network or a wide-area wireless network operated by a cellular network carrier (e.g., LTE, WiMAX, UMTS, CDMA2000, GSM).

In some implementations, communication between the driver's device and the passenger's device can be accomplished by broadcasted signals that are detectable by other devices within the vehicle cabin, but that generally do not have the range to be detected by devices outside vehicle cabin. Such techniques can ensure that navigation data is transferred only among co-located devices within the same vehicle, so that passengers in adjacent vehicles do not inadvertently receive navigation data from the wrong driver's device, for example. In some implementations, the broadcasted signals may be unsecured, so as to allow any navigation devices within the vehicle to receive the signals. Therefore, a driver's device and one or more passenger's devices may share navigation data without any previous association between the devices and without any work needed by the user to formally "pair" the devices. Rather, merely by virtue of the driver's device and the passenger device(s) being located within the same vehicle, the devices may be capable of sharing navigation data with each other.

This approach can be beneficial as compared to other approaches, which generally involve a prior association between the devices and/or the vehicle. For example, users generally must initiate pairing of specific devices over BLUETOOTH, or must identify a particular network to join or devices to communicate with using WIFI and some other communication protocols.

Sometimes, however, it is desirable to allow data to be shared with minimal user effort as quickly as possible. For example, a driver may be pre-occupied with navigating heavy traffic and cannot be distracted to help a passenger pair with his phone (driver's navigation device), join an appropriate network, or otherwise provide detailed instruction to establish communications between the passenger's device and the driver's device. One such communications protocol that may realize one or more of these advantages is described more fully below with respect to FIG. 4, for example. In some implementations, that communications protocol may employ high frequency audio signals (e.g., above 20 kHz and outside the range of normal human hearing capability) to transmit navigation data between a driver's device and one or more passenger's devices. For example, a speaker driven by the driver's navigation device may broadcast high frequency audio tones encoded with data usable by the passenger's device to determine a navigation state of the driver's device. The data transmission speeds of audio signal broadcasting may be relatively low (e.g., as compared to RF transmissions), and therefore the data transmitted between devices via audio may be compressed and minimalized. In some implementations, for example, the driver's device may share a route with a passenger's device by broadcasting a pointer (e.g., a navigation URL or other network address) to a network location at which the passenger's device can access a file representing the route being navigated by the driver's device, and/or other information about the navigation state of the driver's device. The pointer that is broadcasted through the audio signal may have a relatively small data size as compared to the actual navigation data referenced by the pointer. The passenger's device, upon receiving the pointer, may then use other communications means (e.g., WIFI, LTE) to access, via a higher bandwidth connection, the navigation data located at the address specified by the pointer.

At stage 212, upon establishing communication with the driver's device, the passenger's device requests that the driver's device share its navigation state with the passenger's device. The navigation state of the driver's device may include one or more pieces of information that describe the navigation parameters of a trip currently being traveled by the driver's device, or that is set to be traveled at a future time. The navigation state may include, for example, information that specifies a particular route to a destination, one or more alternative routes to the destination, and/or one or more points of interest that the device has been programmed to navigate through on the way to the destination. The passenger may request the information, for example, in order to explore information about the trip, to discover points of interest along a planned route, or to further assist the driver with navigation instructions or to make modifications to a planned route.

In some implementations, before requesting that the driver's device share its navigation state with the passenger's device, the passenger's device may enter into a "passenger mode" that causes the passenger's device to broadcast a message announcing its presence in the vehicle. The message may be anonymous, in that it contains no identifying information about the passenger's device or about any users associated with the passenger's device, or the message may include information that uniquely identifies the passenger's device or a user of the passenger's device. The driver's device, being in a "driver's mode," may be listening for such messages and may detect the message transmitted by the passenger's device. In turn, the driver's device may broadcast a message that acknowledges the passenger device's message, and that confirms to the passenger device the availability of a driver's device. In some implementations, the acknowledgment may carry additional information that indicates whether the driver's device has navigation state data available to share, and that indicates particular types of navigation data that the driver's device is configured to share. The message may further include information that identifies the driver or the driver's device. For example, the driver's device may transmit a message to the passenger's device that contains the name of the driver, or a name associated with an account on the driver's device. Thus, if the driver's name were Jacob, the driver's device could transmit a message indicating to the passenger device that the passenger is in Jacob's vehicle, and that navigation state data is available to be shared. In some implementations, rather than acknowledging a message broadcast by the passenger's device and then waiting for another message requesting that navigation data be shared, the driver's device may instead immediately respond with a message containing the navigation data that reflects the driver's device's current navigation state (or containing a pointer to navigation data stored remotely). These actions are indicated in the flow-chart of FIG. 2A at stage 214, where the driver's device receives the request to share navigation data, and at stage 218, where the driver's device transmits navigation data (or a pointer to the navigation data) for the first route.

In some implementations, the process 200 may include a stage 216 at which the driver's device authenticates the passenger's device before sharing navigation data with the passenger's device. The authentication may take several forms. For example, in some implementations, the driver's device may generate a prompt that asks the driver whether he or she would like to share navigation data with a requesting passenger device. The prompt may be presented to the driver by visual means, aural means, or both, such as by display on a screen of the driver's device, display on an integrated vehicle screen, play through speakers of the driver's device, and/or play through speakers of the vehicle. If the operator of the passenger's device requesting the navigation data to be shared is named Jennifer, for example, the prompt may simply ask the driver whether he or she wishes to share navigation data with passenger Jennifer. The driver can then then accept or reject the request. If the driver accepts, the process 200 proceeds to stage 218. If the driver rejects the request, the process 200 may terminate, without navigation data being shared among the devices.

In some implementations, the driver's device may verify that the passenger's device is making the request for navigation data on behalf of an authorized requestor. In some implementations, the requestor can be authenticated based on credentials provided by the passenger's device in the request to the driver's device. In some implementations, the driver's device (or an account associated with the driver's device) may maintain a whitelist of approved passengers who the driver has authorized to receive shared navigation data. If the credentials or other identifying information provided by the passenger's device indicate that the requestor is among the approved passengers in the whitelist, then the driver's device may automatically grant the request and transmit to the passenger's device navigation data for the first route (stage 218). On the other hand, if the passenger's credentials are not sufficient to grant the request for navigation data sharing, the driver's device may deny the request either with notice or transparently to a user of the driver's device. In some implementations, the driver's device may generate a prompt notifying the driver that an unauthorized passenger would like to receive shared navigation data, so as to allow the driver to select whether or not to grant access to the passenger. In some implementations, a passenger may be added to the whitelist only temporarily, or the authorization may last only while certain conditions remain true. For example, the driver may select to add a passenger to the whitelist only for the duration of a trip (e.g., until the vehicle arrives at a certain destination). The driver may also select a timeframe for the authorization, such that the authorization is automatically revoked at the expiration of the timeframe (e.g., a number of hours, days, or weeks).

In some implementations, the driver's device can determine whether to share navigation data with a particular passenger based on whether that passenger is determined to be a member of one or more groups that the driver has pre-authorized to receive navigation data from the driver's device. For example, a driver may specify one or more social network groups (e.g., friends, family, co-workers) whose members are authorized to receive navigation data. The driver's device may use identifying information transmitted from the passenger's device to check the requestor's identity against the membership of approved groups. A request to share the driver's navigation data may be granted or denied accordingly. For example, the driver may setup a social network group that includes only a small group of persons who are taking a planned trip with the driver. Each of the persons in the group may then be granted access to receive navigation data shared from the driver's device. The authorization may have an indefinite duration, or it may be specifically limited for the duration of a trip or other time specified by the driver. Examples of other groups that the driver may approve as authorized navigation data recipients may include the group of persons in the driver's electronic address book or contact list, persons in the driver's call history list, persons listed in an exchange address book, and persons with whom the driver is scheduled to conduct business in calendar events. Authenticating requestors in this manner can be beneficial because it ensures a prior relationship between the driver and the passenger that has requested the driver's navigation data, but it may not require additional effort for the driver or passenger, for example, to establish a network connection, to pair the devices with each other, or to enter credentials manually.

In some implementations, the driver may grant different permissions to different groups or different individual passengers. For example, the driver may grant permission to a first passenger to receive the driver's navigation state, but may restrict the first passenger from modifying the driver's navigation state or otherwise setting parameters associated with the driver's device. A second passenger, however, may be granted permission to both receive data characterizing the driver's navigation state, and also be granted permission to modify the driver's navigation state (e.g., permission to update a route at the passenger's device and to share the updated route with the driver's device).

In some implementations, the process 200 may not require that the passenger's device be authenticated before allowing the driver's navigation data to be shared. For example, the driver may simply place his or her phone or other navigation device into a driver's mode that is configured to allow the driver's navigation data to be shared with any devices in range of the driver's device (e.g., devices co-located in the same vehicle as the driver's device). This may be useful, for example, for bus passengers or other passengers on public transportation who wish to view the bus route and projected times of arrival at stops along the route. Any passenger on the bus may be capable of receiving the driver's shared navigation data without needing to authenticate themselves with a network or with the driver's device. In some implementations, the passengers may be restricted from modifying the bus route, even though they may be view the route.

At stage 220, the passenger's device receives the navigation data (or a pointer to the navigation data) that was transmitted by the driver's device at stage 218. If the transmitted data included a pointer to the navigation data stored at a remote server, the passenger's device can automatically take action to access the navigation data from the server. Once the driver's navigation data is obtained by the passenger's device, the passenger's device may, at stage 222, initiate navigation along the first route indicated by the navigation data. For example, a navigation application running on the passenger's device may replicate the route being navigated by the driver's device on the passenger's device, and may provide turn-by-turn directions to the passenger. While navigating the first route, the navigation application may provide an overhead map view that shows a representation of all or a portion of the first route, such as by placing graphical markers at locations on the map that correspond to the current geographic location of the vehicle, the destination of the first route, and any points of interest that the first route has been programmed to travel through. The overhead map view may further include graphical indications of the roads and highways, for example, that comprise the first route, such as by highlighting the representations of those roads and highways on the map. In some implementations, the navigation application of the passenger's device may provide a user interface that shows text or other content that identifies the first route that is being navigated as a route that was shared by the driver. For example, the route may be annotated with text that shows the route is "$Driver's Route," where $Driver is a variable that indicates the name of the driver. The user interface may also provide other indications that the first route has been shared by a driver, and is thus not a route that the passenger programmed independently. For example, a persistent text element displayed in the user interface may state "You are in $Driver's Vehicle," or may include another statement to similar effect.

While the passenger's device is navigating the first route, the passenger may interact with the navigation application in generally similar ways to how the passenger could interact with an independently programmed route. For example, the passenger may view a representation of the first route overlaid on a map and/or may view a list of turn-by-turn directions for the first route. The user may zoom in on the map to different portions of the first route, and may inspect traffic conditions along the first route.

In some implementations, the passenger may also modify the route shared by the driver's device, as indicated in FIG. 2A (stage 224), and may then share the modified route with the driver's device so as to cause the driver's device to update the initially programmed route with the modified route programmed by the passenger, as indicated in FIG. 2B (stages 226-232). In this way, the driver may effectively delegate at least partial control of the driver's device's navigation state to the passenger and the passenger's device. In some implementations, these techniques may thus free the driver from needing to directly interact with the driver's device to perform route modifications, which may be distracting to the driver while driving. The driver and the passenger may then engage in a conversation to collaboratively determine route modifications or other deviations from an initially planned trip, although the passenger (rather than the driver) may be responsible for implementing the modifications.

In some implementations, the passenger can modify the first route shared from the driver's device by selecting alternative routes suggested by the navigation application on the passenger's device. The alternative routes may be determined locally by the driver's device, or may be determined by a remote navigation server that has provided the alternatives to the passenger's device. Because the passenger is not consumed with the responsibility of actually driving the vehicle, the passenger may take time to more closely inspect different route alternatives to determine a preferred route for the trip. For example, the passenger may consider differences in estimated arrival times to a common destination resulting from the different routes, and/or other factors such as traffic conditions, road construction, road conditions, road types (e.g., interstate vs. city streets), scenery, and point-of-interest along the routes. The passenger may also discuss route alternatives with the driver and with one or more other passengers in the vehicle, and upon reaching a consensus, may select the preferred alternative route. The selected route may comprise a different, second route that is transmitted from the passenger's device to the driver's device (stage 226). At stage 228, the driver's device receives the second route, and at stage 232, the driver's device changes from navigating the first route to navigating the second route as selected by the passenger.

In some implementations, the driver's device may prompt the driver to accept or deny the route modification proposed by the passenger. For example, upon receiving the navigation data specifying the second route, the driver's device may continue to navigate the first route until the driver selects a control displayed or otherwise presented by the driver's device that confirms the driver's intention to navigate the second route. In some implementations, the driver's device may preview the second route so that the driver can make an informed decision about whether to accept changes to the first route in favor of the second route. For example, the driver's device may display a list of one or more changes between the first route and the second route and a difference in estimated arrival times to the destination as between the two routes (e.g., "Passenger Marie has proposed navigating to Target Field via I-35 N (ETA 21 minutes) rather than via Minnesota Highway 100N (ETA 17 minutes). Accept changes?"). In some implementations, the driver's device may automatically change from navigating the first route to navigating the modified (second) route provided by the passenger's device, but may generate an audible and/or visual alert to the driver that a route change has been effected. In some implementations, after invoking navigation of the modified (second) route, the navigation application at the driver's device may provide a user-selectable control that allows the driver to revert back to the previous route after a modified route has been invoked.

The passenger's device may communicate new navigation data to the driver's device in a like manner to how the driver's device initially communicated its navigation data to the passenger's device. For example, short-range or longer-range wireless communication protocols may be employed to carry communications among the devices, such as NFC, RFID, Bluetooth, WI-FI, or wideband wide area networks (e.g., LTE, CDMA, GSM). In some implementations, the devices may broadcast high-frequency audio signals at a level designed to have a range that extends an entirety of a vehicle cabin, but that is not so powerful as to be detectable by a standard receiver outside the vehicle. In some implementations, this approach can realize one or more advantages as compared to some other approaches, such as the ability to quickly share information among devices without a need for the driver and passenger to spend effort pairing the devices or otherwise requiring a prior association between the devices to communicate navigation data between the devices. In some implementations, information specifying the modified (second) route may be transmitted directly from the passenger's device to the driver's device. In some implementations, the messages communicated directly from the passenger's device to the driver's device may not contain the actual navigation data specifying the modified (second) route; instead, the messages may include one or more pointers (e.g., URLs) to network locations at which the driver's device can access, from a remote server external to the vehicle, the actual the actual navigation data that encodes a representation of the modified (second) route.

While the driver uses his or her personal device or the vehicle navigation system to navigate the second route, the passenger may continue to interact with the navigation application on his or her personal device to perform various tasks related to navigation of the second route. Referring to FIGS. 2B and 2C, for example, stages 234-248 of the flowchart 200 show a process by which a current route may be updated based on search results generated in response to a passenger-initiated query. In particular, at stage 234, while both the driver's device and the passenger's device are navigating the second route, the passenger may enter a search query in the navigation application at the passenger's device, and may then submit a search request based on the search query. The search request may be submitted to a search engine at a remote server external to the vehicle (e.g., through an LTE, GSM, or other wideband wireless area network). The search engine may be determine a set of search results that are determined to be relevant to the user's search query, and the results are provided to the passenger's device at stage 236. In some implementations, the search results may indicate points of interest that are located within a maximum distance of the vehicle and/or within a maximum distance of the second route. For example, the user may perform a search for "gas stations," and the search results may indicate one or more gas stations located in the vicinity of the vehicle and/or in the vicinity of an upcoming portion of the route that the vehicle will be traveling. In some cases, modification of the second route may be required in order to direct the vehicle to locations corresponding to one or more of the search results. In some implementations, a route may be updated based on the passenger's selection at the passenger's device of one or more search results (points of interest). The route may be updated in various ways depending on the user's instruction, such as by replacing the ultimate destination of the route with a location indicated by one of the search results, or by maintaining the ultimate destination that was originally programmed while re-directing the route through the locations corresponding to the selected search result(s) before the route eventually reaches the ultimate destination.

At stage 238, the passenger can select to share all or a portion of the obtained search results with the driver's device. In response to the passenger's selection to share search results, the passenger's device can use a suitable communication protocol to transmit information concerning the selected search results to the driver's device. In some implementations, data representing the search results may be directly transmitted to the driver's device from the passenger's device. In some implementations, the passenger's device may transmit a compressed URL or other pointer to the driver's device, rather than the search results themselves. The message containing a pointer to the search results may alert the driver's device to the availability of search results that the passenger wishes to share with the driver. The driver's device may automatically access the shared search results, in some implementations, upon receipt of the pointer (stage 240).

When search results shared by a vehicle passenger are available, the navigation application on the driver's device may generate an audio and/or visual alert to the driver. The driver may then select to view the list of shared search results, and may select any of the search results to view more detailed information concerning the location or point of interest corresponding to the search result. In a similar manner to how the passenger could modify the route the based on selection of a search result, at stage 242, the driver can also modify the route by selecting one or more search results for locations that he or she would like to visit along the way to an ultimate destination, or by selecting a search result for a new location to replace the pre-existing destination of the second route. In response to the driver's selection of one or more of the shared search results, the driver's device may prompt the driver to confirm that the driver intends to change the current route. If the driver confirms his or her intent to change the current (second) route, the driver's device can initiate navigation of the modified route (i.e., the third route). At stage 244, the driver's device can then transmit navigation data for the third route (e.g., information specifying the third route itself, or a pointer to such information) to the passenger's device. The passenger's device receives the new navigation data from the driver's device at stage 246, and updates the current navigation on the passenger's device from the second route to the third route at stage 248. In some implementations, the passenger's device may automatically update the route, or the passenger's device may prompt the passenger to confirm whether to update the route.

At stage 250, the driver's device may optionally grant the passenger's device rights to control a limited set of extra-navigation features on the driver's device. The extra-navigation features are generally features, whether within the navigation application or outside the navigation application on the driver's device, that the driver would typically control if her or she were not driving, and that do not pertain to the core functions of setting, analyzing, modifying, and navigating routes. Two examples of such extra-navigation features are described with respect to stages 252-262 of the flowchart for process 200 in FIG. 2C (namely, (i) control of audio streams played through the driver's device and (ii) managing telephone calls through the driver's device). By delegating control of certain extra-navigation features to the passenger's device during a trip, the passenger may assist the driver in managing tasks that would be distracting, or even unsafe, for the driver to handle while driving. Moreover, the passenger can manage those tasks on his or her personal device, without needing to take the driver's device away from the driver while it is being used for navigation purposes. In some implementations, the passenger's rights to control extra-navigation features on the driver's device may be time-limited by either a definite amount of time, or the rights may be set to expire upon the occurrence of one or more triggering events (e.g., the trip is completed, the driver selects a control to revoke the passenger's rights, the vehicle has stopped for a threshold length of time, and/or the vehicle is determined to have arrived at the route destination). In some implementations, the driver may customize the set of rights granted to different passengers. For example, a first passenger in a vehicle may be authorized to manage telephone calls (but not podcasts or the playing of other media content), whereas as second passenger in the vehicle may be authorized to manage podcasts or the playing of other media content (but not telephone calls).

Stages 252-256 relate to a first example extra-navigation feature of passenger-controlled audio streaming. In this example, the passenger may use his or her personal computing device to control an audio stream (or other type of media stream, such as video streams). For example, the driver may have connected his or her device at the outset of a trip to the vehicle's speaker system so that the driver's device plays streaming radio, streaming music, podcasts, and/or other audio content through the vehicle's speaker system. This configuration may also allow synthesized speech generated by the driver's navigation application to recite turn-by-turn directions through the vehicle's speaker system. In some implementations, the driver's device can transmit messages to the passenger's device that the passenger's device can use to control one or more audio/media playing applications on the driver's device. For example, the driver's device may send information to the passenger's device that allows the passenger's device to access a list of songs or audio files in the driver's library (e.g., a playlist). At stage 252, the driver may select a particular audio file from the driver's playlist, and at stage 254 an indication of the selected file is communicated to the driver's device. The driver's device then receives the message from the passenger's device that identifies the selected audio content, and at stage 256, the driver's device can begin playing the selected audio content through the driver's device's speakers and/or through the vehicle's speakers.

Stages 258-262 relate to a second example extra-navigation feature on the driver's device that may be managed through the passenger's device, namely initiating a telephone call on the driver's device through the passenger's device. At stage 258, the passenger may access a user interface on the passenger's device for making calls through the driver's device. In some implementations, the user interface may include a virtual numeric keypad. The passenger can punch a number into the keypad that the driver's device should call, then the entered phone number can be transmitted to the driver's device (stage 260), and the driver's device can finally dial and make the call as instructed (stage 262). In some implementations, the driver's device may transfer or otherwise allow the passenger's device to access at least a portion of the driver's contact list. The passenger can then select a name from the contact list, thereby causing the passenger's device to transmit an instruction to the driver's device to call the selected contact.

In some implementations, the driver's device may grant the passenger's device rights to control other types of extra-navigation features in addition to or alternatively to call management and media management. For example, a passenger may be allowed to respond to text messages or e-mails in the driver's account while the driver is driving, and/or a passenger may be granted access to the driver's contact list or calendar.

Figure 3:
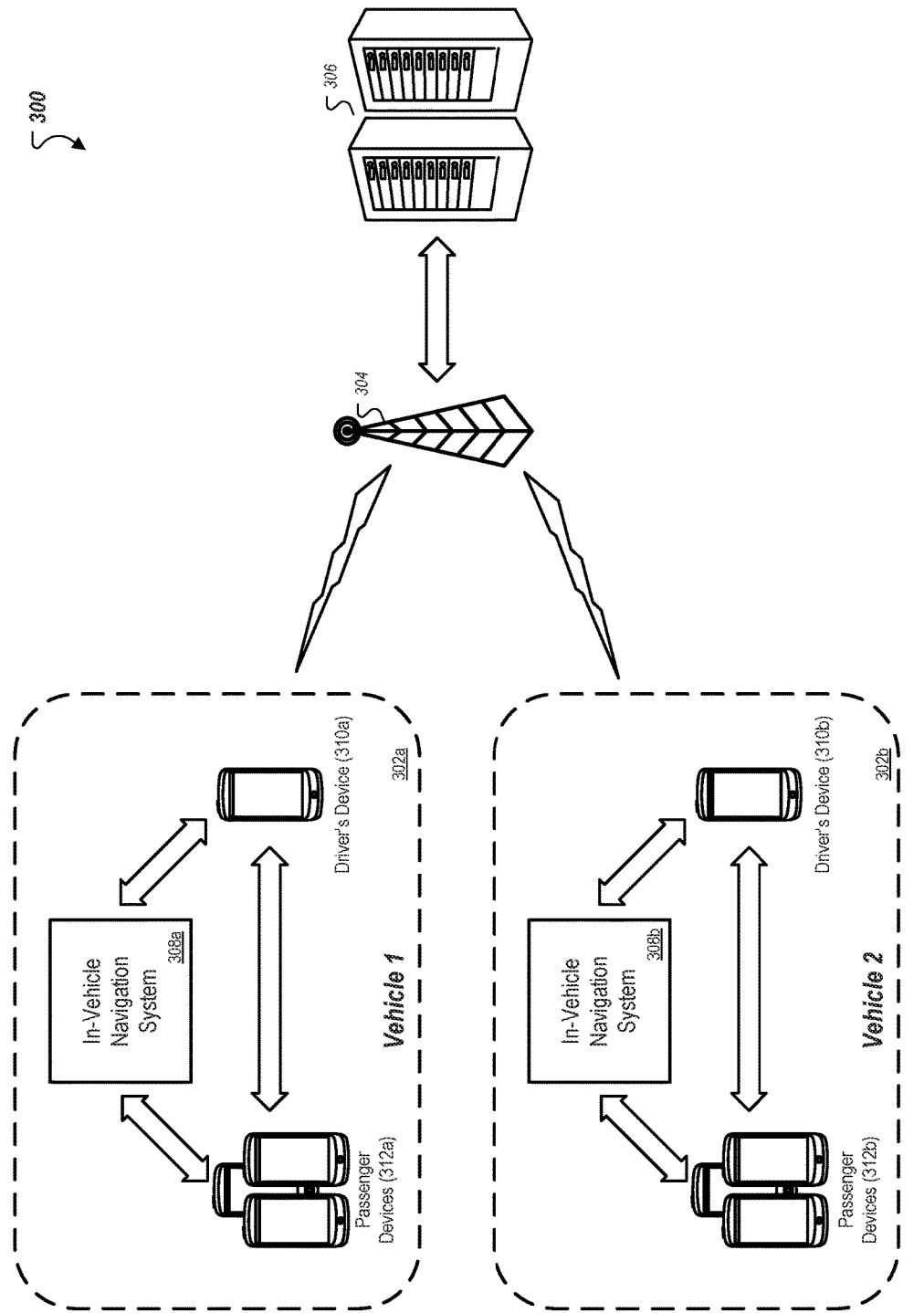
FIG. 3 is a conceptual diagram of an example system of computing devices located in a pair of vehicles. The set of computing devices in each vehicle are capable of sharing navigation data with other devices within the same vehicle, but generally not with devices located in other vehicles.
Figure 4:
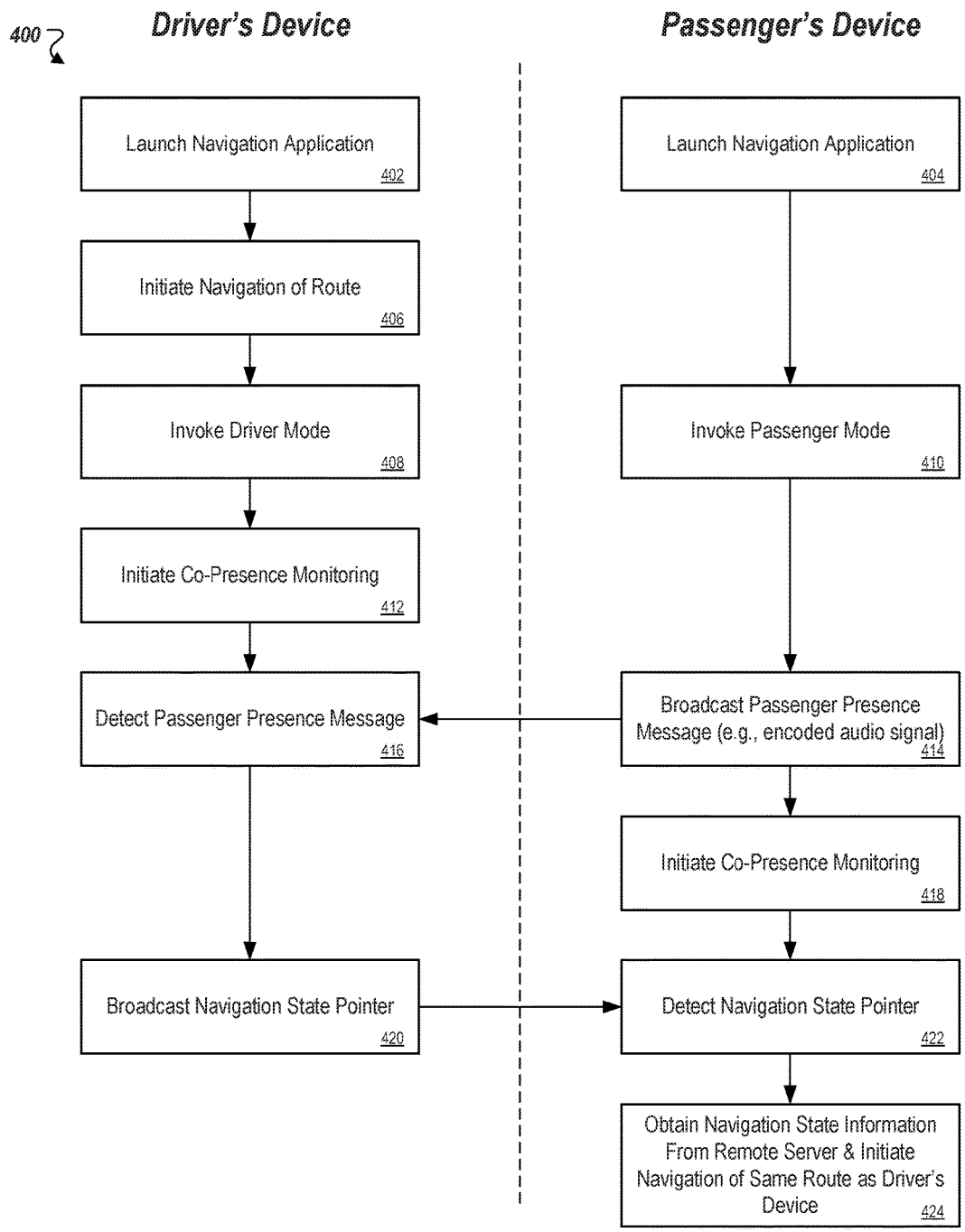
FIG. 4 depicts a swim-lane diagram of an example process for sharing navigation data among co-located computing devices. The process illustrates a communication protocol that may be used by a passenger's device and a driver's device that are within proximity of each other to share information characterizing the driver's navigation state with the passenger's device.

Turning now to FIG. 3, a conceptual diagram is shown of an example system 300 sharing navigation data among devices co-located in a vehicle. The figure depicts a pair of vehicles 302a, 302b. Each vehicle 302a, 302b includes an in-vehicle navigation system 308a, 308b, a driver's computing device 310a, 310b, and one or more passenger computing devices 312a, 312b. All or some of the devices and systems in the vehicles 302a, 302b may communicate with a remote navigation server 306 through a wireless communications network 304. The system 300 is generally intended to illustrate that the techniques for sharing navigation data described herein (and techniques for sharing other, related types of data as described herein) may be implemented with a variety of different arrangements of devices in a vehicle. In some implementations, these various arrangements of the system 300 may be used to carry out the methods, processes, and other techniques described herein, including process 200 (FIGS. 2A-2C) and process 400 (FIG. 4).

The possible arrangements of devices and systems in each of the vehicles 302a, 302b are generally equivalent. For example, each vehicle may include a driver's device 310a, 310b, one or more passenger's devices 312a, 312b, and a respective in-vehicle navigation system 308a, 308b. Two vehicles 302a, 302b are depicted to show that communications between the respective sets of devices/systems in each vehicle 302a, 302b are generally restricted to only those devices/systems co-located in the same vehicle 302a, 302b. That is, measures can be taken to reduce the possibility that passenger devices 312b in the second vehicle 302b communicate with and receive navigation data from the driver's device 310a in the first vehicle 302a, or that passenger devices 312a in the first vehicle 302a communicate with and receive navigation data from the driver's device 310b in the second vehicle 302b. Referring to the devices/systems in the first vehicle 302a, for example, the driver's device 310a, the passenger's device(s) 312a, and/or the in-vehicle navigation system 308 may restrict the sharing of navigation data with only other devices or systems that are confirmed to be co-located in the same vehicle 302a. If a passenger's device 312b requests that navigation data be shared from driver's device 310a or from in-vehicle navigation system 308a, for example, the driver's device 310 or in-vehicle navigation system 308a can check whether the passenger's device 312b is located in the first vehicle 302a. Because the passenger's device 312b is not located in the same vehicle, the request for shared navigation data can be denied.

In some implementations, the communication protocol that is used to transmit messages among co-located devices and systems can substantially ensure that devices and systems external to a particular vehicle do not receive navigation data shared from those devices and systems co-located within the vehicle. For example, navigation messages (e.g., containing navigation data or pointers to navigation data) may be communicated using relatively low-level audio signals from speakers of devices and systems in the vehicle. The audio signals may have a center frequency above the range of human hearing (e.g., above 20 kHz), and may be modulated with an analog or digital representation of a navigation message. For example, a pointer to navigation data representing a route, or representing a complete navigation state, of the driver's device 310a can be transmitted by a high-frequency audio signal emitted by one or more speakers of the driver's device 310a. A microphone of the passenger's device(s) 312a can then detect and decode the audio signal to recover the pointer to the navigation data. The amplitude of the audio signal can be set to control the range of the signal, such that only the microphones of devices co-located in the vehicle cabin, for example, can detect the audio signal (using conventional audio receiving equipment). Devices in the second vehicle 302b, or in other vehicles, would be outside the range of the audio signals of devices in the first vehicle 302a. In some implementations, other short range wireless technologies such as NFC, RFID, BLUETOOTH, or WI-FI, may also be configured to limit the sharing of navigation data among only co-located devices in a vehicle.

In some implementations, each vehicle 302a, 302b may maintain a registry of devices co-located within the corresponding vehicle 302a, 302b. Requests from the devices to share navigation data can be checked against the registry to verify that the requestor device is located in the same vehicle as the device or system that is being requested to share its navigation data. If the devices are co-located in the same vehicle, the request may be approved and navigation data shared. If the devices are determined to not be co-located, the request may be denied and the navigation data prevented from being shared. In some implementations, devices may be manually entered into the registry. A unique identifier may be assigned to each device (e.g., the in-vehicle navigation system 308a, driver's device 310a, and each of the passenger devices 312a), which is then stored in the registry. Messages transmitted between the devices, such as requests to share navigation data, may include the identifier, which can be used by the target device to verify that the requestor is co-located in the same vehicle. In some implementations, devices may be automatically added to the registry based on one or more signals that indicate a device is located within a particular vehicle. For example, the registry may be maintained by the driver's device and/or the in-vehicle navigation system 308a. When the passenger devices 312a are placed in a driver's mode, they may periodically transmit their current location (e.g., as determined by GPS signals) and a unique device identifier to the device or system that maintains the registry. If the location data from a particular passenger device 312a matches current location data for the vehicle or the driver's device, then the passenger device 312a can be determined to be located in the first vehicle 302a. The passenger device 312a can be added to the registry accordingly. In some implementations, the registry may be stored and maintained by one or more of the in-vehicle navigation system 308a, the driver's device 310a, the passenger's devices 312a, and the remote navigation server 306. In some implementations, the registry may have a finite life, or entries for particular devices in the registry may have a finite life. The registry or particular entries in the registry may expire, for example, after a defined amount of time and/or upon the occurrence of defined events (e.g., the conclusion of a trip, arrival at a destination of a route). Therefore, passengers may not be granted a continuous authorization to receive a driver's navigation data. Instead, the right may be limited for the duration of a trip, or for a particular number of hours, days, weeks, etc.

In some implementations, a device may be determined to be present in a vehicle based on information detected by one or more sensors in the vehicle. The sensors may indicate the presence of passengers in the vehicle, may indicate the presence of the driver in the vehicle, and/or may indicate the presence of navigation devices in the vehicle. For example, the first vehicle 302a may have pressure transducers located in each seat of the vehicle. When a person is seated in a given seat, the respective pressure transducer for that seat can detect a load and output a signal to a vehicle computing system identifying the load. Similarly, seatbelt sensors may indicate when the seatbelt at each seat of the vehicle 302a is buckled and in use. Signals from any of these sensors, and others, can be used by the in-vehicle navigation system 308a to determine whether the seat is occupied by a person during a trip. If the vehicle 302a is determined to have two passengers, for example, then the in-vehicle navigation system 308a may allow navigation data to be shared with devices associated with the two passengers. If no passengers are determined to be in the vehicle, then sharing of navigation data may be blocked or restricted, so that navigation data is not inadvertently shared with unauthorized devices outside of the vehicle. The driver may have the ability to override any determination about the presence of passengers in a vehicle. For example, if the computer erroneously believes that no passengers are present, the driver may nonetheless authorize a request from the passenger's device to share the driver's navigation data. In some implementations, the vehicle 302a and/or the in-vehicle navigation system 308a may expose an application programming interface (API) to the driver's device 310a, which may allow the driver's device 310a to obtain the vehicle's occupancy sensor data or estimations derived from such data about the occupancy of the vehicle 302a.

As previously mentioned, the system 300 may be configured to accommodate navigation data sharing among different numbers and different arrangements of devices in a particular vehicle 302a or 302b. Referring to the first vehicle 302a, for example, the driver's device 310 may in some implementations communicate with and share navigation data with multiple passenger's devices 312a. In some implementations each of the multiple passenger's devices 312a may receive navigation data shared from the driver's device 310a. In some implementations, individual sessions can be established between the driver's device 310a and each of the passenger's devices 312a. In each session, the respective passenger's device 312a may request navigation data from the driver's device 310a, and the driver's device 310a may transmit the navigation data (or a pointer to the navigation data) to the corresponding passenger's device 312a. In some implementations, the driver's device 310a may broadcast a signal (e.g., an audio signal) that is receivable by all of the passenger's devices 312a due to their proximity to the driver's device 310a in the vehicle. The broadcasted signal may be detected and used by each of the passenger's devices 312a to obtain and execute the navigation data shared by the driver's device 310a. In some implementations, different ones of the passenger's devices 312a may be granted different permissions with respect to the ability to interact with the driver's device during a trip. For example, the driver may be willing to share the driver's current navigation state with all the passengers in a vehicle, so that the passengers can view the route for a given trip, inspect traffic conditions, search for points of interest along the routes, and track the progress of a trip. However, the driver may wish to restrict the ability of all but one of the passengers to update the route on the driver's device or to control extra-navigation features on the driver's device (e.g., telephone call management, audio stream management). Accordingly, the driver may grant permission to a first of the passenger's devices 312a to share updated navigation data with the driver's device, to update routes, and control extra-navigation features. All other passenger's devices 312a in the vehicle 302a may be restricted to the ability to receive navigation data. In some implementations, when the first passenger's device 312a updates a route, the message can be first transmitted by the first passenger's device to the driver's device 310a, thereby causing the driver's device 310a to update its navigation based on the new route and to relay the new route information to each of the other passenger's devices 312a. In some implementations, when the first passenger's device 312a updates a route, the first passenger's device 312a can broadcast the updated route information (or pointers to the route information) to both the driver's device 310a and to the other passenger's devices 310a directly.

Although many of the examples described herein relate to communications between a driver's device 310a and one or more passenger's devices 312a, in some implementations the in-vehicle navigation system 308a may play a significant role in the navigation functions and sharing of navigation data among devices in the vehicle 302a. The in-vehicle navigation system 308a may be a fixed component of the vehicle. For example, the navigation system 308a may include an electronic display that is built into a dashboard or console of the vehicle 302a. In some implementations, the navigation system 308a may be part of a broader information and entertainment system of the vehicle 302a. In some implementations, all or a portion of the actions that have elsewhere been described as being performed by the driver's personal device 310a may be performed instead by the in-vehicle navigation system 308a. The passenger's devices 312a may, for example, request navigation data from the in-vehicle navigation system 308a, and may in turn share modified navigation data with the in-vehicle navigation system 308a. In some implementations, the in-vehicle navigation system 308a may be configured to navigate a route that was initially programmed on the driver's device 310a. For example, before departing on a trip, the driver may program a route for the trip on his or her smartphone (driver's device 310a). The route may then be downloaded to the in-vehicle navigation system 308a (e.g., through the cloud or directly from the driver's device 310a via a wired or wireless connection). During the trip, the passenger's devices 312a may then request and obtain navigation data for the route from either the driver's device 310a or the in-vehicle navigation system 308a. Modifications to the route being navigated by the in-vehicle navigation system 308a can be communicated straight from the passenger's devices 312a to the in-vehicle navigation system 308a, or the driver's device 310a may serve as an intermediary that routes navigation data from the passenger's devices to the in-vehicle navigation system 308a.

FIG. 4 is a swim-lane diagram that depicts an example process 400 for sharing navigation data among co-located devices. The process 400 illustrates a communication protocol that may be used by a passenger's device and a driver's device that are within proximity of each other to share information characterizing the driver's navigation state with the passenger's device. Although not expressly depicted in FIG. 4, similar techniques could also be used to share information characterizing the passenger's device's navigation state (e.g., navigation data for a modified route) with the driver's device. In some implementations, messages transmitted between the driver's device and the passenger's device in the process 400 can be audio signals encoded with digital or analog data that conveys the appropriate message to the receiving device. The audio signals can have a center frequency above the normal range of human hearing, such as greater than or equal to 20 kHz, greater than or equal to 21 kHz, or greater than or equal to 25 kHz. Audio signal communications in this manner can be advantageous in some implementations, because the short range of the audio signal may prevent devices that are located beyond the near vicinity of the transmitting device from receiving the audio signals. Additionally, the protocol represented in FIG. 4 can allow the passenger's device and the driver's device to communicate with minimal, if any, setup effort by the owners or users of the respective devices. For example, the users need not engage in a formal pairing process in which the devices are placed into a pairing mode in order to establish a direct connection between the devices. The devices need also not be brought into very short proximity with each other (e.g., several inches or less) as would occur in NFC or RFID data transfers, and which may be distracting to the driver of a vehicle. Nonetheless, in some implementations, other communication techniques may be employed, including by transmission of short-range radio waves between the devices.

At stage 402, the driver's device launches a navigation application. The navigation application may be installed on the driver's device, may be a web-based application, or may be mirrored from a server, for example. The driver may be about to embark on a road trip for which he or she has programmed in the navigation application a geographic route to a particular destination. At stage 406, the driver provides input to the navigation application that causes the navigation application to begin navigating the route. While navigating the route, the navigation application may track the current location of the vehicle (e.g., using GPS signals), may present turn-by-turn directions for following the route to the destination, and may display a representation at its current location on a map that shows the roads along the route, for example. The driver may be traveling with a passenger, and may wish to enlist the passenger's help in reviewing the route during the trip. Therefore, the driver may allow the driver's device's navigation state to be shared with the passenger's device. In some implementations, the driver may, at stage 408, place the driver's device into a driver's mode. While in the driver's mode, the navigation application on the driver's device may be configured to detect the presence of passenger's devices, share navigation data with one or more passenger's devices, receive route modifications, and/or delegate control of extra-navigation features (e.g., telephone call management) to a passenger's device. In some implementations, the driver's device may be placed in driver's mode in response to user selection of a control on the driver's device to invoke the driver's mode. In some implementations, the driver's device may be placed in driver's mode automatically based on one or more external signals that indicate to the navigation application that the driver's device should be placed in driver's mode. For example, the driver's device may automatically pair with a fixed computing system in the vehicle (e.g., via BLUETOOTH), where thereby informs the driver's device that the driver is located in his own vehicle. Under the assumption that the driver would be driving his own vehicle, the navigation application may by default enter into driver's mode. As a result of being in driver's mode, the driver's device can then initiate co-presence monitoring (stage 412). Co-presence monitoring generally involves monitoring for any discoverable passenger's devices in proximity of the driver's device. In some implementations, the co-presence monitoring is passive, in that the driver's device may use one or more microphones on the device to listen for the messages transmitted by any passenger's devices that may be requesting navigation data from the driver's device. In some implementations (not shown in FIG. 4), the co-presence monitoring may be active in that probe messages can be periodically transmitted from the driver's device to check for available passenger's devices in proximity of the driver's device.

Meanwhile, either before, during or after the driver's device's actions at stages 402, 406, and 408, and 412, the passenger's device may be configured to communicate with the driver's device and to receive shared navigation data from the driver's device. At stage 404, the passenger's device launches a navigation application, and at stage 410, the passenger's device enters a passenger's mode. In the passenger's mode, the passenger's device may be configured to perform actions such as establishing communications with a driver's device in proximity to the passenger's device, requesting and receiving navigation data shared by driver's device, controlling extra-navigation features of the driver's device that have been delegated to the passenger, modifying routes provided by the driver's device, and/or communicating modifications of the route to the driver's device. In some implementations, immediately upon entering passenger mode, the passenger's device can broadcast a passenger presence message (e.g., via a high-frequency audio signal) so as to alert and discover any driver's devices that may be in proximity of the passenger's device. The passenger's device may then initiate co-presence monitoring by listening for a response to the passenger presence message from any driver's devices in proximity of the passenger's device. At stage 416, the driver's device detects the passenger presence message broadcasted from the passenger's device, and in response at stage 420, the driver's device broadcasts information that is usable for the passenger's device to obtain the driver's device's navigation state. In some implementations, data that completely specifies the navigation state is directly transmitted from the driver's device to the passenger's device. In some implementations, the data may be compressed, so as to minimize the size of the message directly transferred from the driver's device to the passenger's device, especially if the message is transmitted on a relatively low frequency channel with little bandwidth (e.g., audio signal encoding). In some implementations, the driver's device may not transmit the information that specifies the navigations state of the driver's device itself, but may instead transmit an address or other pointer that identifies a location in the cloud where the passenger's device can access. This too may be beneficial to reduce the size of the message transmitted between the driver's device and the passenger's device.

At stage 418, the passenger's device initiates co-presence monitoring after transmitting the passenger presence message, and at stage 422 during such monitoring, the passenger's device detects the message transmitted from the driver's device that contains the navigation state information or navigation state pointer. At stage 424, the passenger's device uses the navigation state pointer to retrieve the navigation state data from a cloud-based server remote from the vehicle in which the driver's device and the passenger's device are located. The passenger's device then reconstructs the same route that is being navigated by the driver's device using the navigation state data, and initiates navigation of the route in the navigation application.

In some implementations, the driver's device and the passenger's device can use high-frequency audio signals as a mechanism to ensure that multiple devices are in proximity to each other, even as all navigation data or pointers to navigation data are communicated among the devices out-of-band (i.e., separately from the high-frequency audio signals). For example, the driver's device in driver mode may broadcast an audio signal containing a unique identifier for the driver's device. The passenger's device may then use the identifier from the audio signal to access any current navigation data stored in a cloud-based database in association with the driver device's identifier, and the driver's navigation data may be downloaded to the passenger's device. In some implementations, continued sharing of navigation data between the driver's device and the passenger's device may be conditioned on the driver's device and the passenger's device remaining in close proximity to each other, as they would be if co-located within the same vehicle. Therefore, the devices may periodically ping each other using a short range, high-frequency audio signal. If no response is received to one or more pings, then subsequent sharing of navigation data may be blocked (or the users of either or both of the devices may be prompted as to whether they wish to continue sharing navigation data).

Figure 5:
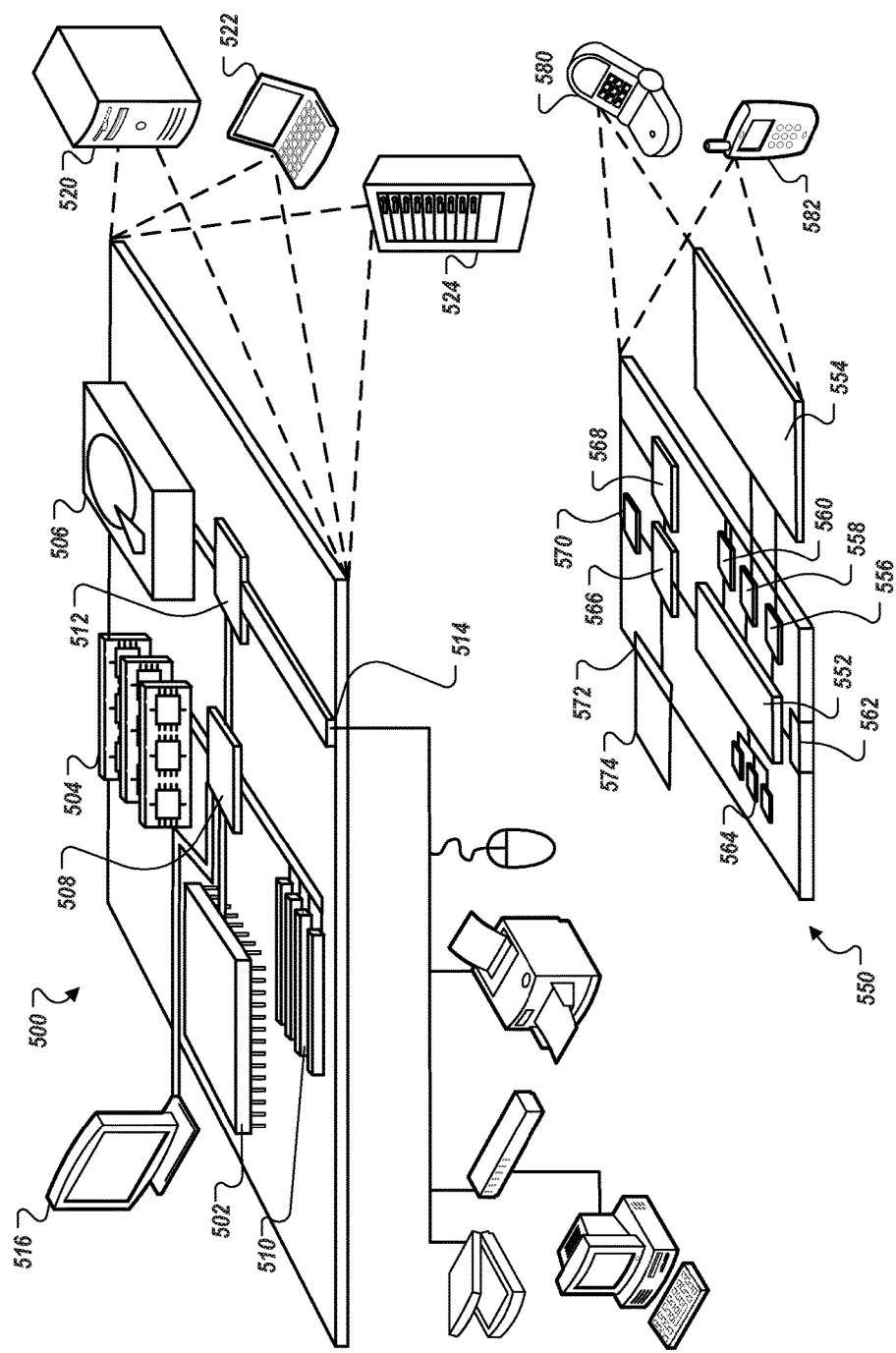
FIG. 5 depicts an example of a computing device and a mobile computing device that can be used to implement the techniques described herein. For example, the passenger's devices and the driver's devices described herein may have hardware like that described with respect to the mobile computing device in FIG. 5.

FIG. 5 shows an example of a computing device 500 and a mobile computing device that can be used to implement the techniques described herein. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for sharing navigation data among co-located computing devices, comprising:
    receiving, at a first computing device that is running a navigation application that has been programmed to navigate a geographic route, a request from a second computing device for the first computing device to share the geographic route with the second computing device;
    in response to receiving the request and determining that the second computing device or a user of the second computing device is authorized to receive navigation data shared by the first computing device, encoding an audio signal with information indicative of the geographic route being navigated by the navigation application of the first computing device; and
    outputting, with one or more speakers of the first computing device or one or more speakers of a vehicle, and to the second computing device, the audio signal.

2. The computer-implemented method of claim 1, further comprising:
    in response to receiving the request from the second computing device for the first computing device to share the geographic route with the second computing device:
    (i) determining an identity of the second computing device or an identity of the user of the second computing device, and
    (ii) based on the identity of the second computing device or the identity of the user of the second computing device, determining whether the second computing device or the user of the second computing device is authorized to receive navigation data shared by the first computing device.

3. The computer-implemented method of claim 2, wherein determining whether the second computing device or the user of the second computing device is authorized to receive navigation data shared by the first computing device comprises determining whether a social media account of a user of the first computing device is connected to a social media account of the user of the second computing device.

4. The computer-implemented method of claim 2, wherein determining whether the second computing device or the user of the second computing device is authorized to receive navigation data shared by the first computing device comprises determining whether the user of the second computing device is listed in a contact list for a user of the first computing device.

5. The computer-implemented method of claim 1, further comprising:
    receiving, by the first computing device, at a time that is after the audio signal is output and while the navigation application running on the first computing device continues to navigate the route, a second audio signal from the second computing device that is encoded with other information indicative of a different, second route to a destination or another destination; and
    in response to receiving the second audio signal, automatically determining the second route and re-programming the navigation application running on the first computing device to navigate the different, second route.

6. The computer-implemented method of claim 1, wherein:
    the first computing device is a mobile computing device or is at least a portion of an integrated navigation computer system installed in the vehicle, and
    the second computing device is a mobile computing device.

7. The computer-implemented method of claim 1, wherein a center frequency of the audio signal is at least 20 kilohertz.

8. The computer-implemented method of claim 1, wherein the audio signal encodes an address that indicates a location on a computer network at which information that specifies the geographic route can be accessed.

9. The computer-implemented method of claim 1, comprising outputting the audio signal with the one or more speakers of the vehicle.

10. One or more non-transitory computer-readable media having instructions stored thereon that, when executed by one or more processors, cause the one or more processors to perform operations comprising:
    receiving, at a first computing device that is running a navigation application that has been programmed to navigate a geographic route, a request from a second computing device for the first computing device to share the geographic route with the second computing device;
    in response to receiving the request and determining that the second computing device or a user of the second computing device is authorized to receive navigation data shared by the first computing device, encoding an audio signal with information indicative of the geographic route being navigated by the navigation application of the first computing device; and
    outputting, with one or more speakers of the first computing device or one or more speakers of a vehicle, and to the second computing device, the audio signal.

11. The computer-readable media of claim 10, wherein the operations further comprise:
    in response to receiving the request from the second computing device for the first computing device to share the geographic route with the second computing device:
    (i) determining an identity of the second computing device or an identity of the user of the second computing device, and
    (ii) based on the identity of the second computing device or the identity of the user of the second computing device, determining whether the second computing device or the user of the second computing device is authorized to receive navigation data shared by the first computing device.

12. The computer-readable media of claim 11, wherein determining whether the second computing device or the user of the second computing device is authorized to receive navigation data shared by the first computing device comprises determining whether a social media account of a user of the first computing device is connected to a social media account of the user of the second computing device.

13. The computer-readable media of claim 11, wherein determining whether the second computing device or the user of the second computing device is authorized to receive navigation data shared by the first computing device comprises determining whether the user of the second computing device is listed in a contact list for a user of the first computing device.

14. The computer-readable media of claim 10, wherein the operations further comprise:

receiving, by the first computing device, at a time that is after the audio signal is output and while the navigation application running on the first computing device continues to navigate the route, a second audio signal from the second computing device that is encoded with other information indicative of a different, second route to a destination or another destination; and in response to receiving the second audio signal, automatically determining the second route and re-programming the navigation application running on the first computing device to navigate the different, second route.

15. The computer-readable media of claim 10, wherein:
the first computing device is a mobile computing device or is at least a portion of an integrated navigation computer system installed in a vehicle, and
the second computing device is a mobile computing device.

16. The computer-readable media of claim 10, wherein a center frequency of the audio signal is at least 20 kilohertz.

17. The computer-readable media of claim 10, wherein the audio signal encodes an address that indicates a location on a computer network at which information that specifies the geographic route can be accessed.

18. A first computer device, comprising:
one or more processors; and
one or more computer-readable media having instructions stored thereon that, when executed by the one or more processors, cause performance of operations comprising:
receiving, at the first computing device while the first computing device is running a navigation application that has been programmed to navigate a geographic route, a request from a second computing device for the first computing device to share the geographic route with the second computing device;
in response to receiving the request and determining that the second computing device or a user of the second computing device is authorized to receive navigation data shared by the first computing device, encoding an audio signal with information indicative of the geographic route being navigated by the navigation application of the first computing device; and
outputting, with one or more speakers of the first computing device or one or more speakers of a vehicle, and to the second computing device, the audio signal.

* * * * *